(12) United States Patent
Zou

(10) Patent No.: US 10,157,304 B2
(45) Date of Patent: Dec. 18, 2018

(54) FINGERPRINT IDENTIFICATION MODULE, FINGERPRINT IDENTIFICATION DEVICE AND DISPLAY DEVICE

(71) Applicant: BOE Technology Group Co., Ltd., Beijing (CN)

(72) Inventor: Xiangxiang Zou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 152 days.

(21) Appl. No.: 15/252,784

(22) Filed: Aug. 31, 2016

(65) Prior Publication Data

US 2017/0270339 A1     Sep. 21, 2017

(30) Foreign Application Priority Data

Mar. 21, 2016 (CN) .......................... 2016 1 0162060

(51) Int. Cl.
*G06K 9/20* (2006.01)
*G06K 9/00* (2006.01)

(52) U.S. Cl.
CPC ................................. *G06K 9/0004* (2013.01)

(58) Field of Classification Search
CPC ..................................... G06K 9/00006–9/0012
See application file for complete search history.

(56) References Cited

U.S. PATENT DOCUMENTS

| | | | | |
|---|---|---|---|---|
| 5,448,649 A | * | 9/1995 | Chen | G06K 9/00046 356/71 |
| 5,818,956 A | * | 10/1998 | Tuli | G06K 9/00046 382/126 |
| 5,942,761 A | * | 8/1999 | Tuli | G06K 7/10722 250/556 |
| 2009/0074255 A1 | * | 3/2009 | Holm | G06K 9/0004 382/115 |
| 2015/0104083 A1 | * | 4/2015 | Gu | G06K 9/0004 382/124 |

FOREIGN PATENT DOCUMENTS

| | | |
|---|---|---|
| CN | 104318204 A | 1/2015 |
| CN | 204463160 U | 7/2015 |
| CN | 105260708 A | 1/2016 |

OTHER PUBLICATIONS

Sep. 5, 2018—(CN) First Office Action Appn 201610162060.2 with English Translation.

* cited by examiner

*Primary Examiner* — Brian Werner
(74) *Attorney, Agent, or Firm* — Banner & Witcoff, Ltd.

(57) ABSTRACT

A fingerprint identification module, a fingerprint identification device and a display device are provided. The fingerprint identification module includes a transparent substrate, an emission part, a receiving part and a moving part, wherein the emission part and the receiving part are provided adjacent to opposite edges of the transparent substrate, and the emission part and the receiving part are fixed on the moving part, wherein, light emitted from the light sources is incident in the transparent substrate at a first angle $\theta_1$ so as to be propagated in the transparent substrate in a total reflection form; the transparent substrate is provided with an adjusting structure configured to allow the light to exit; the receiving part is configured to receive the light exiting through the adjusting structure; and the moving part is configured to allow the emission part and the receiving part to be moved.

19 Claims, 7 Drawing Sheets

FINGERPRINT IDENTIFICATION MODULE, FINGERPRINT IDENTIFICATION DEVICE AND DISPLAY DEVICE

This application claims priority to and the benefit of Chinese Patent Application No. 201610162060.2 filed on Mar. 21, 2016, which application is incorporated herein in its entirety.

TECHNICAL FIELD

The present disclosure relates to a fingerprint identification module, a fingerprint identification device and a display device.

BACKGROUND

With improving of life standard, various kinds of terminal apparatus have become necessities in the life, and the requirement on the terminal apparatus by the users is also increasingly increased. Fingerprint identification is widely used in the various kinds of terminal apparatus due to its excellent privacy protection function, to improve the user's experience and safety.

Currently, the fingerprint identification function generally can only be achieved in a non-display region, and for the display region, the fingerprint identification function cannot be achieved, whereby proportion of a fingerprint identification region to the whole display device is caused to be lowered down largely, and thus the user's experience is degraded.

Based on this, if a capacitive fingerprint identification module is integrated into a display region of a display device, not only the capacitive fingerprint identification module is required to have high touch precision, but also dimensional requirement on a touch unit in a touch structure is also restrict. Furthermore, integrating the capacitive fingerprint identification module into the display region of the display device will cause process difficulty and cost of a touch IC (integrated circuit) to be largely increased, therefore, it is difficult to achieve integrating the fingerprint identification module into the display region of the display device.

SUMMARY

An embodiment of the disclosure provides a fingerprint identification module including a transparent substrate, an emission part, a receiving part and a moving part, wherein the emission part and the receiving part are provided adjacent to opposite edges of the transparent substrate, and the emission part and the receiving part are fixed on the moving part, wherein, the emission part includes a plurality of light sources arranged side by side, light emitted from the light sources is incident in the transparent substrate at a first angle $\theta_1$ so as to be propagated in the transparent substrate in a total reflection form, the first angle $\theta_1$ is an angle between the incident light and an incident surface; the transparent substrate is provided with an adjusting structure configured to allow the light totally reflected in the transparent substrate to exit and irradiate towards the receiving part; the receiving part is configured to receive the light incident into the transparent substrate and exiting through the adjusting structure; and the moving part is configured to allow the emission part and the receiving part to be moved simultaneously in a same direction and by a same displacement.

In some examples, the light is incident into the transparent substrate at the first angle $\theta_1$, and is totally reflected after being refracted at a second angle $\theta_2$, $\theta_2$ satisfies:

$$\theta_2 \geq \arctan\left(\frac{L}{2D}\right);$$

wherein L is a width of a finger, D is a thickness of the transparent substrate, and the second angle $\theta_2$ is an angle between the light incident into the transparent substrate and before a first total reflection is occurred and a normal line of the incident surface.

In some examples, $\theta_2$ further satisfies:

$$\theta_2 \leq \arctan\left(\frac{S}{2D}\right);$$

wherein S≥2L, and S is a moving distance of the moving part.

In some examples, the light sources are configured to emit parallel and unidirectional infrared light.

In some examples, the receiving part includes a plurality of first receivers arranged side by side, and the first receivers correspond to the light sources one by one.

In some examples, the receiving part includes a prism and a second receiver; the prism is configured to irradiate the light emitted by each of the light sources via the adjusting structure to the second receiver; wherein the plurality of light sources arranged side by side emit the light sequentially.

In some examples, the emission part includes two columns of light sources, each column includes a plurality of light sources arranged side by side, wherein except the light sources located at both ends of the columns, any one of the light sources in any one column is located between two light sources in the other column.

In some examples, the moving part includes a first moving sub part and a second moving sub part; the emission part is fixed on the first moving sub part and the receiving part is fixed on the second moving sub part.

In some examples, the emission part and the receiving part are provided below the transparent substrate; or the emission part and the receiving part are respectively provided at lateral sides of the opposite edges of the transparent substrate.

In some examples, the adjusting structure includes a prism structure or a microstructure.

In some examples, the receiving part includes an optical sensor.

In some examples, the light sources arranged side by side in the emission part are arranged in a direction perpendicular to a direction from one edge to another edge of the opposite edges of the transparent substrate.

In some examples, the first receivers in the receiving part are arranged in a direction perpendicular to a direction from one edge to another edge of the opposite edges of the transparent substrate.

In some examples, the moving part is configured to move in a direction parallel with a surface of the transparent substrate and perpendicular to an arrangement direction of the plurality of light sources.

An embodiment of the disclosure provides a fingerprint identification device including any fingerprint identification module as mentioned above and a processor; wherein the processor is connected with the receiving part in the fingerprint identification module for obtaining fingerprint information according to intensity of the light received by the receiving part.

An embodiment of the disclosure provides a display device including a display panel and a fingerprint identification device as mentioned above, wherein the fingerprint identification module in the fingerprint identification device is provided above the display panel.

BRIEF DESCRIPTION OF THE DRAWINGS

In order to more clearly describe the technical solution of the embodiments of the present invention, the attached drawings for the embodiments will be briefly described, it is obvious that the attached drawings in the following description only illustrate some embodiments of the present invention, but not are intended to limit the present invention.

DETAILED DESCRIPTION

Figure 1A:
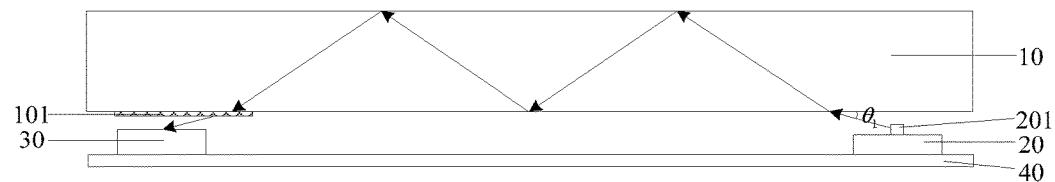
FIG. 1(a) is a first schematic view illustrating structure of a fingerprint identification module provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A fingerprint identification module is provided by an embodiment of the present disclosure. As illustrated in FIG. 1 and FIG. 2, the fingerprint identification module includes a transparent substrate 10, a emission part 20, a receiving part 30 and a moving part 40. The emission part 20 and the receiving part 30 are respectively provided adjacent to opposite edges of the transparent substrate 10, and are fixed on the moving part 40.

The emission part 20 includes a plurality of light sources 201 arranged side by side, light emitted from the light sources 201 is incident into the transparent substrate 10 at a first angle $\theta_1$ to be propagated in the transparent substrate 10 in total reflection form. For example, the first angle $\theta_1$ is a angle between the incident light and a incident surface.

The transparent substrate 10 is provided with an adjusting structure 101 for allowing the light propagated in the transparent substrate 10 in total reflection form to exit and irradiate to the receiving part 30.

The receiving part 30 is used to receive the light incident into the transparent substrate 10 from each of the light sources 201 and exiting through the adjusting structure 101. For example, the receiving part includes an optical sensor.

The moving part 40 is used to move the emission part 20 and the receiving part 30 at the same time (simultaneously), in a same direction and by same displacement.

For example, the moving part is configured to move along a direction parallel with a surface of the transparent substrate.

It is to be noted that firstly, there is no limitation on material for the transparent substrate 10, as long as light emitted from the light sources 201 can be propagated in the transparent substrate 10, and, for example, can be transparent glass. When the fingerprint identification module is applied on a display device, the transparent substrate 10 may be a protection cover plate of the display device.

Secondly, the number of the light sources provided in the emission part 20 can be suitably set according to the area of the region in which the fingerprint identification is to be achieved. All the light sources 201 can emit light simultaneously or sequentially. In order to avoid the light emitted from the plurality of light sources 201 from interfering with each other and ensure that the light emitted from each of the light sources 201 is only incident on ridge lines 02 or furrow lines 01 of a fingerprint, the light emitted from the light sources 201 has a diameter less than distance between two adjacent ridge lines 02 (the distance between the adjacent ridge lines 02 is about several tens micrometer). For example, the light sources 201 can be LEDs (light emitting diode), which emit light having a diameter in the order of nanometers.

Figure 1B:
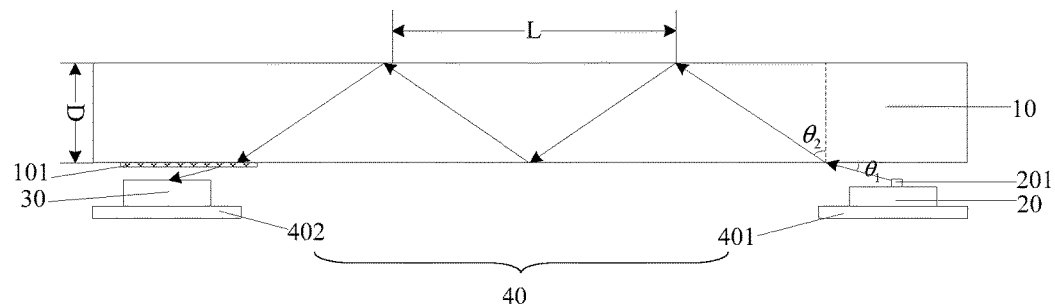
FIG. 1(b) is a second schematic view illustrating structure of a fingerprint identification module provided by an embodiment of the present disclosure.

Here, the light emitted by the light source 201 can be controlled to be incident in the transparent substrate 10 at the first angle $\theta_1$ directly, of course, another adjusting structure can be provided on the transparent substrate 10 so that the light emitted by the light sources 201, after being adjusted by the another adjusting structure, is incident into the transparent substrate 10 at the first angle $\theta_1$ (in FIG. 1(a) and FIG. 1(b), the example in which the light emitted by the light sources 201 is directly incident into the transparent substrate 10 at the first angle $\theta_1$ is schematically illustrated).

Thirdly, the particular structure of the receiving part 30 can be determined according to the operation of all the light sources 201 in the emission part 20, as long as the received light incident into the transparent substrate 10 from each of the light sources 201 and exiting through the adjusting structure can be distinguished from each other.

Fourthly, the adjusting structure 101 on the transparent substrate 10 is such that the light totally reflected in the transparent substrate 10 can exit and irradiate towards the receiving part 30, and for example, the adjusting structure 101 can be a prism, a microstructure, or the like.

Fifthly, the moving part 40 can be what is illustrated in FIG. 1(a), the emission part 20 and the receiving part 30 are provided on a same moving part 40, wherein when the fingerprint identification module is applied on the display device, in order to not affect displaying, the material for the moving part 40 should be transparent material. The moving part 40 can also, as illustrated in FIG. 1(b), FIG. 2(a), FIG. 2(b) and FIG. 2(c), include a first moving sub part 401 and a second moving sub part 402, the emission part 20 is provided on the first moving sub part 401, and the receiving part 30 is provided on the second moving sub part 402.

Here, the light sources 201 in the emission part 20 and the receiving devices in the receiving part 30 can be provided on a PCB (printed circuit board) in advance, and then are fixed with the moving part 40 through the PCB.

For the structure of the moving part 40, as long as the emission part 20 and the receiving part 30 are enabled to be moved, the moving part 40, for example, can be a microelectromechanical structure or other mechanical moving device.

For the moving part 40 moving the emission part 20 and the receiving part 30 at the same time (simultaneously), in the same direction and by the same displacement, it is possible that the moving part 40 is controlled through a controlling terminal so as to be always reciprocated along a direction perpendicular to the arrangement direction of the light sources 201; or the receiving part 30 and the moving part 40 are both connected with the controlling terminal, and when intensity of the light received by the receiving part 30 is varied, the controlling terminal controls the moving part 40 to move; alternatively, it is also possible that the fingerprint identification module and a touch structure are included in a same device, and when the touch structure senses finger's pressing, the controlling terminal controls the moving part 40 to move.

Figure 2A:
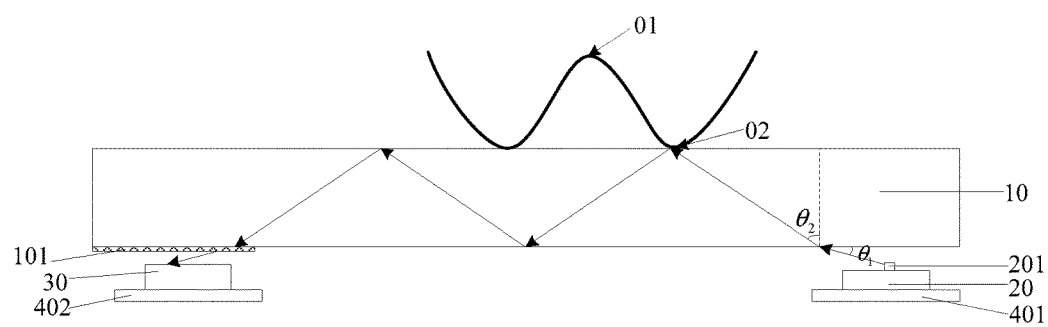
FIG. 2(a) is a first schematic view illustrating movement of a moving part in a fingerprint identification module provided by an embodiment of the present disclosure.
Figure 2B:
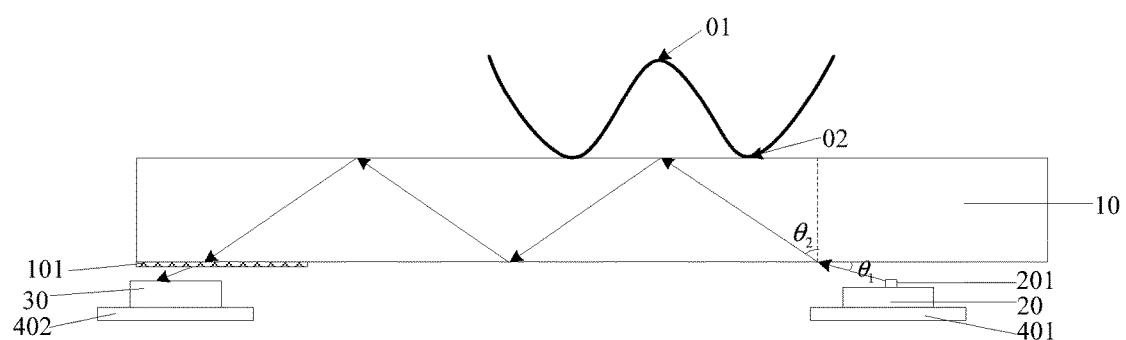
FIG. 2(b) is a second schematic view illustrating movement of a moving part in a fingerprint identification module provided by an embodiment of the present disclosure.
Figure 2C:
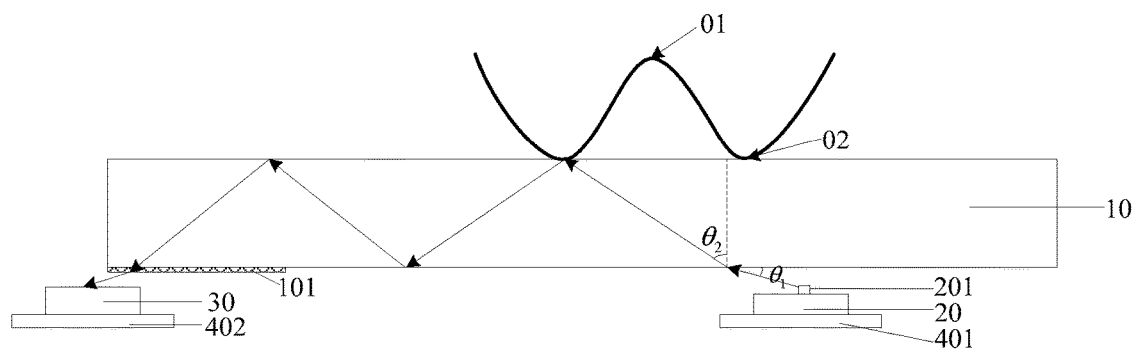
FIG. 2(c) is a third schematic view illustrating movement of a moving part in a fingerprint identification module provided by an embodiment of the present disclosure.

Based on this, as illustrated in FIG. 2(a), FIG. 2(b), and FIG. 2(c), when the moving part 40 is moved in the direction perpendicular to the arrangement direction of the light sources 201, a complete fingerprint information can be obtained.

An embodiment of the present disclosure provides a fingerprint identification module, light is emitted from the plurality of light sources 201 of the emission part 20, the emitted light is propagated in the transparent substrate 10 in total reflection form, and finally exits and is received by the receiving part after being adjusted by the adjusting structure 101. When a finger presses on the transparent substrate 10, since the ridge lines 02 of the fingerprint will change the condition at which the light will be totally reflected in the transparent substrate 10, and allow a part of light irradiated to the ridge lines 02 of the fingerprint to be refracted and to be emitted out of the transparent substrate 10 without being received by the receiving part 30, the strength of the light received by the receiving part 30 is caused to be weakened, since the light, after encountering with the furrow lines 01, would still be received by the receiving part 30, and the intensity of the light will not be varied, the receiving part 30 can determines whether it is a ridge line 02 or a furrow line 01 according to the variation of the intensity of the light. When the moving part 40 moves the emission part and the receiving part at the same time (simultaneously), in the same direction and by the same displacement, the fingerprint for the whole finger can be obtained according to the intensity of the light received by the receiving part 30, and thus the fingerprint identification can be achieved. When the fingerprint identification module is applied on the display device, it can be provided in a display region of the display device, thus the user's experience can be improved, and since the fingerprint identification module is operated by employing optical principle, it has low cost and can be easily implemented.

When the fingerprint identification is performed, in order to prevent the light emitted by the light sources 201 from being twice or multiply reflected to the finger covering region to cause an inaccurate identification, therefore, as illustrated in FIG. 1(b), it is preferable that the light emitted by the light sources 201 is incident into the transparent substrate 10 at the first angle $\theta_1$, and after being refracted at a second angle $\theta_2$, is totally reflected, wherein the $\theta_2$ should satisfy:

$$\theta_2 \geq \arctan\left(\frac{L}{2D}\right) \quad (1)$$

Where L is width of the finger, and D is thickness of the transparent substrate 10. For example, the second angle $\theta_2$ is an angle between the light incident into the transparent substrate and prior to the first total reflection and the normal line of the incident surface.

Furthermore, in order to ensure that all character points of the fingerprint of the finger can be totally extracted, $\theta_2$ should not be infinitely increased, therefore, $\theta_2$ further satisfies:

$$\theta_2 \leq \arctan\left(\frac{S}{2D}\right) \quad (2)$$

Where S≥2L, and S is a moving distance of the moving part 40. That is, the moving part 40 at least moves a distance equal with the width of two fingers.

Here, it is to be noted that in order to enable the light to be totally reflected in the transparent substrate 10 after being incident into the transparent substrate, therefore, $\theta_2$ further satisfies:

$$\theta_2 \geq \arcsin\left(\frac{1}{n_2}\right) \quad (3)$$

Where $n_2$ is refractive index of the transparent substrate 10.

In the embodiment of the present disclosure, the refractive angle of the light incident into the transparent substrate 10, that is, the second angle $\theta_2$, is within an intersection set of the equation (1), the equation (2), and the equation (3), when the second angle $\theta_2$ satisfies the equation (1), the equation (2) and the equation (3), it can be guaranteed that the fingerprint can be normally and accurately identified.

Based on the second angle $\theta_2$ obtained as above described, according to the total reflection equation: $n_1 \sin \theta_1 = n_2 \sin \theta_2$, the incident angle of the light incident into the transparent substrate 10, that is, the first angle $\theta_1$, can be obtained. Wherein $n_2 \geq n_1$, and n1 is refractive index of a medium before the light is incident into the transparent substrate 10.

In some examples, in order to avoid the light emitted from the plurality of light sources 201 from influencing on each other, increase setting density of the light sources 201 and improve utility ratio of the light emitted from the light sources 201, the light sources 201 preferably emit parallel and unidirectional light, furthermore, since infrared light has strong penetration, in order to improve the accuracy of the fingerprint identification, the light sources 201 can emit parallel and unidirectional infrared light.

Figure 3:
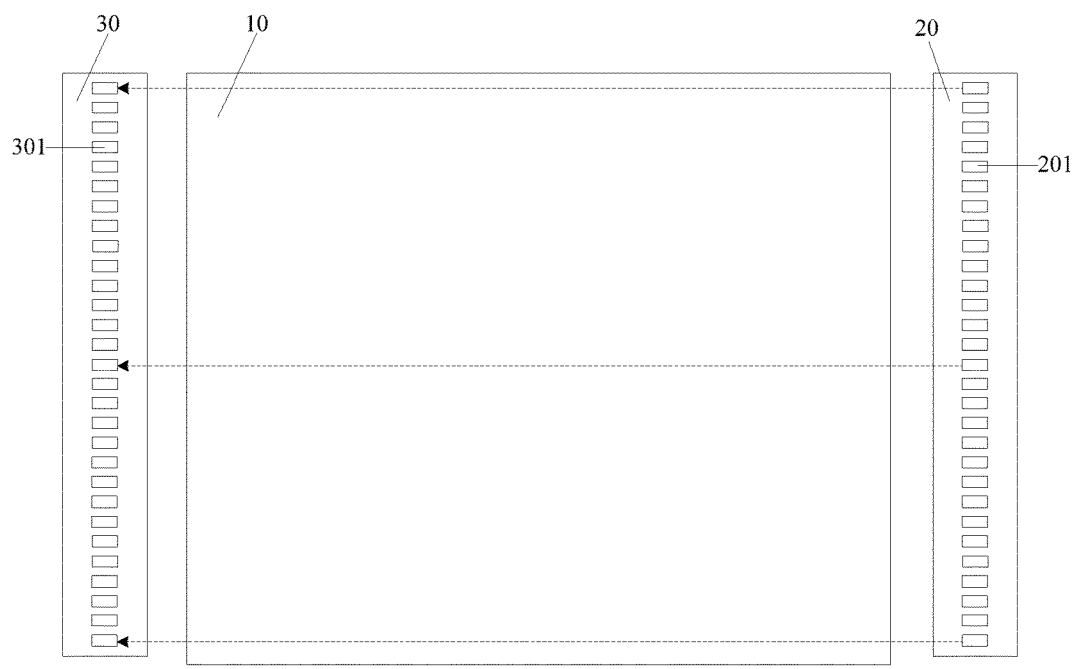
FIG. 3 is a first schematic top view illustrating structure of a fingerprint identification module provided by an embodiment of the present disclosure.

Optionally, as illustrated in FIG. 3, the receiving part 30 includes a plurality of first receivers 301 arranged side by side, the first receivers 301 correspond to the light sources one by one.

For example, the light sources arranged side by side in the emission part are arranged in a direction perpendicular to a direction from one edge to another edge of the opposite edges of the transparent substrate.

For example, the plurality of first receivers in the receiving part is arranged in a direction perpendicular to the direction from one edge to another edge of the opposite edges of the transparent substrate.

For example, the moving part is configured to move in a direction parallel with the surface of the transparent substrate and perpendicular to the arrangement direction of the plurality of light sources.

For the first receivers 301, as long as the light emitted from the corresponding light sources 201 can be received and the strength of the light can be obtained, for example, the first receivers 301 can be any receivers such as photoelectric sensors.

Here, the plurality of light sources 201 can emit the light simultaneously or sequentially, and the first receivers 301 can receive the light emitted from the corresponding light sources 201 simultaneously or sequentially. In order to lower down power consumption of the fingerprint identification module, it is preferable that the plurality of light sources 201 emit the light sequentially.

In the embodiment of the present disclosure, since the first receivers 301 and the light sources 201 correspond to each other one by one, the fingerprint information can be obtained according to the intensity of the light received by the first receivers 301.

Figure 4:
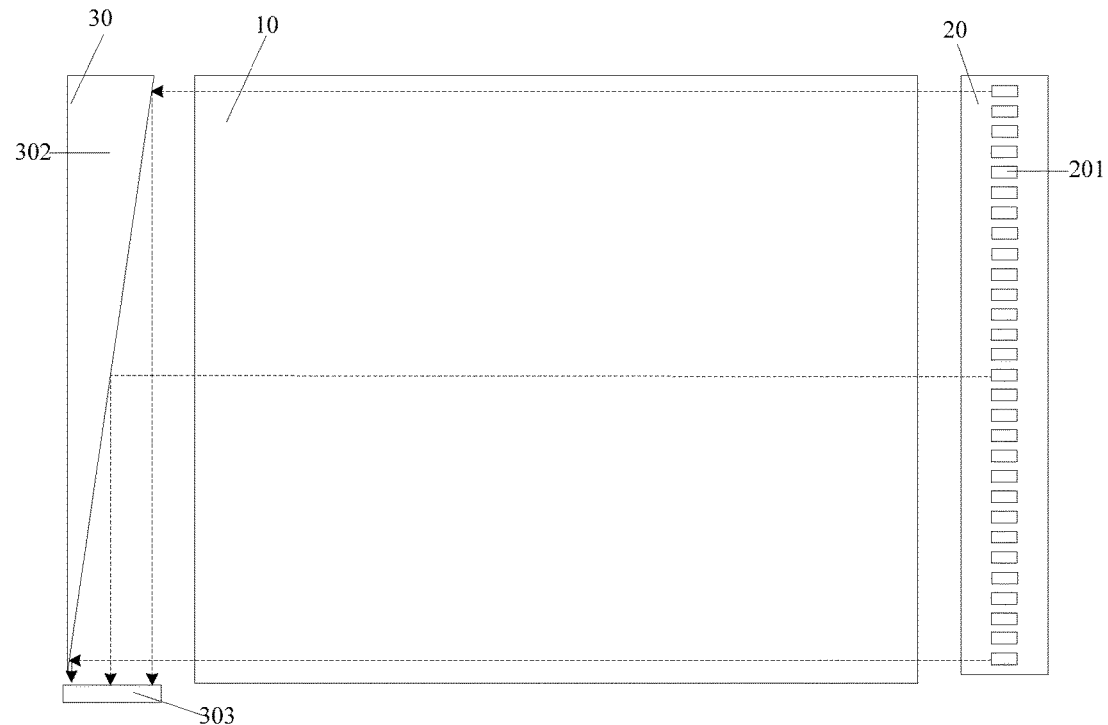
FIG. 4 is a second schematic top view illustrating structure of a fingerprint identification module provided by an embodiment of the present disclosure.

Optionally, as illustrated in FIG. 4, the receiving part 30 includes a prism 302 and a second receiver 303, the prism 302 is used to irradiate the light outgoing from each of the light sources 201 through the adjusting structure 101 to the second receiver 303. The light sources 201 arranged side by side emit the light sequentially.

For the configuration of the prism 302, any form can be adopted as long as the light outgoing via the adjusting structure 101 can be received by the second receiver 303 after passing through the prism 302. The prism 302, for example, is a right angle prism, but other irregular prism can also be used.

Figure 5A:
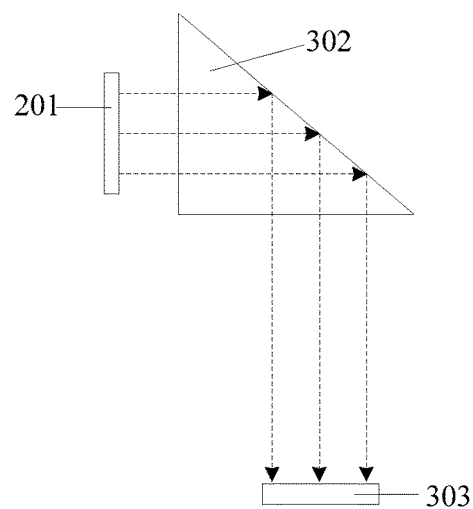
FIG. 5(a) is a schematic view illustrating the principle when a prism is included in a receiving part provided by an embodiment of the present disclosure.

The prism 302 can change the direction of the light incident into the transparent substrate 10 and exited via the adjusting structure 101 so as to be received by the second receiver 303. In particular, as illustrated in FIG. 5(a), when the prism 302 is a right angle prism, and when the light emitted from the light sources 201 is incident into an inclined side of the prism, if the incident angle of the light is larger than a critical angle, total reflection phenomenon of the light will be occurred, that is, the light will not be refractive at the inclined side of the prism 302, but totally reflected to another right angle side of the prism so as to be received by the second receiver 303.

Figure 5B:
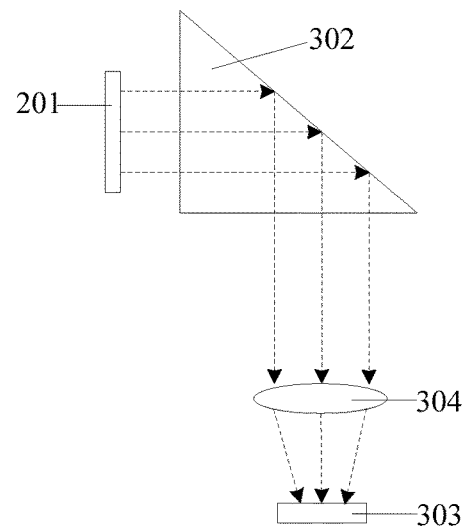
FIG. 5(b) is a second schematic view illustrating the principle when a prism is included in a receiving part provided by an embodiment of the present disclosure.

In some examples, as illustrated in FIG. 5(b), in order to allow all the light can be received by the second receiver 303 after being adjusted by the prism 302, a lens 304 can be provided between the prism 302 and the second receiver 303, so that the light after passing through the prism 302 can be converged by the lens 304, and thus can be totally received by the second receiver 303.

In addition, the second receiver 303 can be identical with the first receiver 301, but can also be different therefrom.

In the embodiment of the present disclosure, by the prism 302 and the second receiver 303, the light emitted from the light sources 201 can be received sequentially with simple structure, the requirement for the light sources 201 and the second receiver 303 to correspond to each other one by one is removed, and the cost is reduced while the process difficulty and manufacturing difficulty are lowered down.

Figure 6:
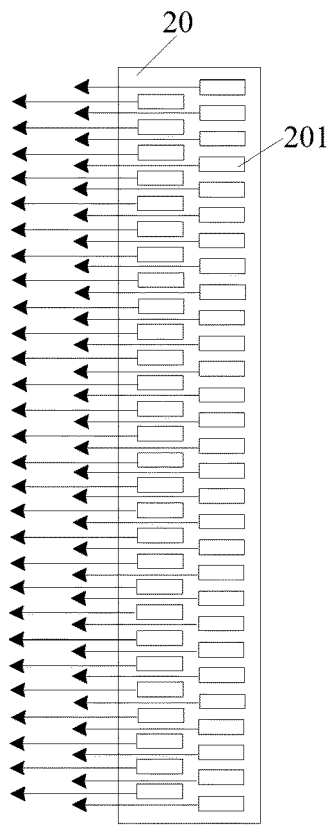
FIG. 6 is a schematic view illustrating structure of a emission part provided by an embodiment of the present disclosure.

In some examples, as illustrated in FIG. 6, the emission part 20 includes two columns of light sources 201, each column includes a plurality of light sources 201 arranged side by side, wherein any one of light sources 201 in any one column, other than the light sources 201 located at both ends thereof, is located between two light sources in another column.

It is to be noted that distance between two adjacent light sources should at least be such that the light emitted from all the light sources 201 would not interfere with each other.

In the embodiment of the present disclosure, two columns of light sources 201 are provided, whereby the density of the light sources 201 is increased, distance between two adjacent light beams is reduced, and thus the fingerprint identification can be performed more accurately.

In some examples, as illustrated in FIG. 1(b), FIG. 2(a), FIG. 2(b) and FIG. 2(c), the moving part 40 includes a first moving sub part 401 and a second moving sub part 402.

The emission part 20 is fixed on the first moving sub part 401, and the receiving part 30 is fixed on the second moving sub part 402.

Here, it is to be noted that when the moving part 40 includes the first moving sub part 401 and the second moving sub part 402, in order to ensure that the light emitted from the light sources 201 and departed after being adjusted by the adjusting structure can be received by the receiving part 30, therefore, the first moving sub part 401 and the second moving sub part 402 should be moved at the same time (simultaneously), in the same direction and by the same displacement.

In the embodiment of the present disclosure, by fixing the emission part 20 and the receiving part 30 respectively on the first moving sub part 401 and the second moving sub part 402, since the emission part 20 and the receiving part 30 are respectively provided to be adjacent to the opposite edges of the transparent substrate 10, the first moving sub part 401 and the second moving sub part 402 can be moved adjacent to the opposite edges of the transparent substrate 10, thus, during their movement, the first moving sub part 401 and the second moving sub part 402 would not affect a middle position of the transparent substrate 10. When the fingerprint module is applied on the display device, displaying of the display region of the display device would not be affected.

Figure 7:
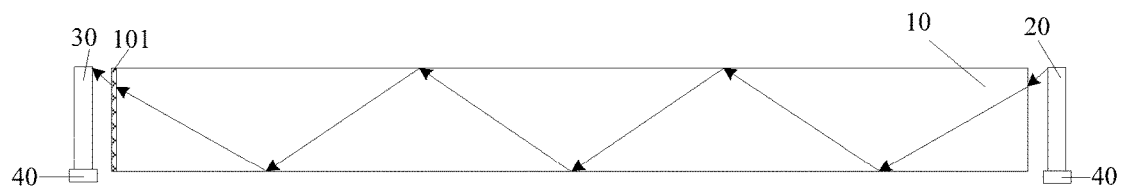
FIG. 7 is a third schematic view illustrating structure of a fingerprint identification module provided by an embodiment of the present disclosure.

In some examples, as illustrated in FIG. 1 and FIG. 2, the emission part 20 and the receiving part 30 are provided below the transparent substrate 10, or as illustrated in FIG. 7, the emission part 20 and the receiving part 30 are respectively provided at lateral sides of the opposite edges of the transparent substrate 10.

Here, the providing position of the emission part 20 and the receiving part 30 with respect to the transparent substrate 10 can be selected as necessary.

In the embodiment of the present disclosure, the emission part 20 and the receiving part 30 are provided below the transparent substrate 10 to reduce width of a bezel, so that the proportion of the fingerprint identification region to the transparent substrate 10 can be increased. The emission part 20 and the receiving part 30 are respectively provided at the lateral sides of the opposite edges of the transparent substrate 10, to reduce thickness of the fingerprint identification module.

Figure 8:
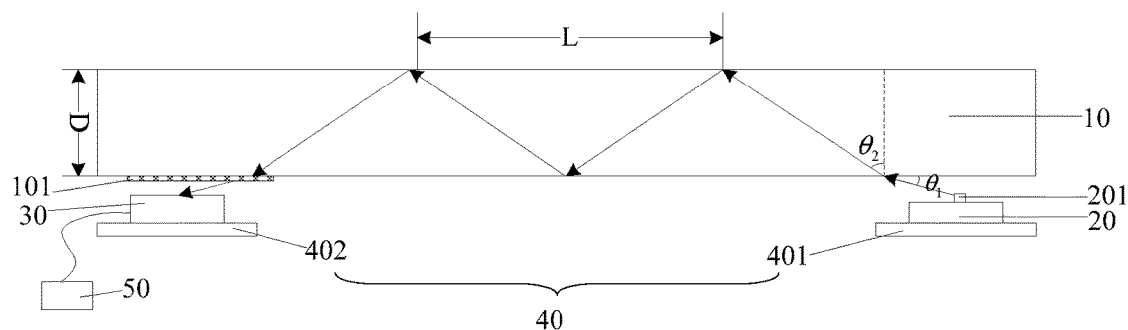
FIG. 8 is a schematic view illustrating structure of a fingerprint identification device provided by an embodiment of the present disclosure.

An embodiment of the present disclosure provides a fingerprint identification device. As illustrated in FIG. 8, the fingerprint identification device includes the above described fingerprint identification module and a processor 50, the processor 50 is connected with the receiving part 30 of the fingerprint identification module for obtaining the fingerprint information according to the intensity of the light received by the receiving part 30.

For the processor 50, any processor can be used, as long as it can obtain the fingerprint information according to the intensity of the light received by the receiving part 30.

Here, it is to be noted that before the fingerprint identification is performed, fingerprint information can be stored in the above fingerprint identification device in advance, as appreciated by the person skilled in the art. The particular operation is as follows: when a finger presses on the transparent substrate 10, the moving part 40 enables the emission part 20 and the receiving part 30 to be moved at the same time, in the same direction and by the same displacement, the receiving part 30 receives the light emitted by the light sources 201 of the emission part 20, and the intensity of the light received by the receiving part 30 is transmitted to the processor 50, and after being processed by the processor 50, a fingerprint is simulated, character points of the fingerprint are extracted, and the obtained fingerprint information is stored.

When a fingerprint is to be identified, the particular operation is as follows: when a finger presses on the transparent substrate 10, the moving part 40 enables the emission part 20 and the receiving part 30 to be moved at the same time, in the same direction and by the same displacement, the receiving part 30 receives the light emitted by the light sources 201 of the emission part 20, and the intensity of the light received by the receiving part 30 is transmitted to the processor 50, after being processed by the processor 50, a fingerprint is simulated, character points of the fingerprint are extracted, and the simulated fingerprint information is compared with the stored fingerprint information, if the character points of the fingerprint matches with each other, then the fingerprint identification is completed, otherwise, the fingerprint identification will be performed again or the fingerprint identification is fail.

Figure 9A:
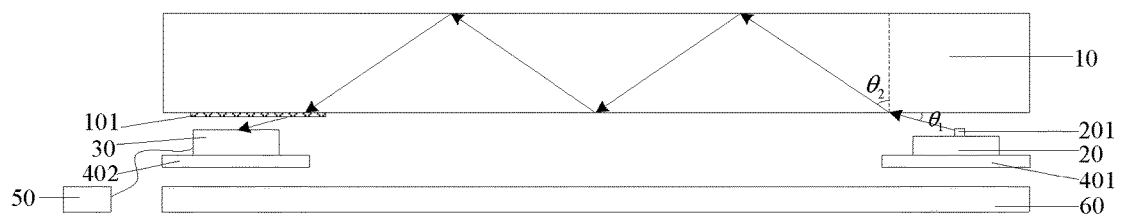
FIG. 9(a) is a first schematic view illustrating structure of a display device provided by an embodiment of the present disclosure.
Figure 9B:
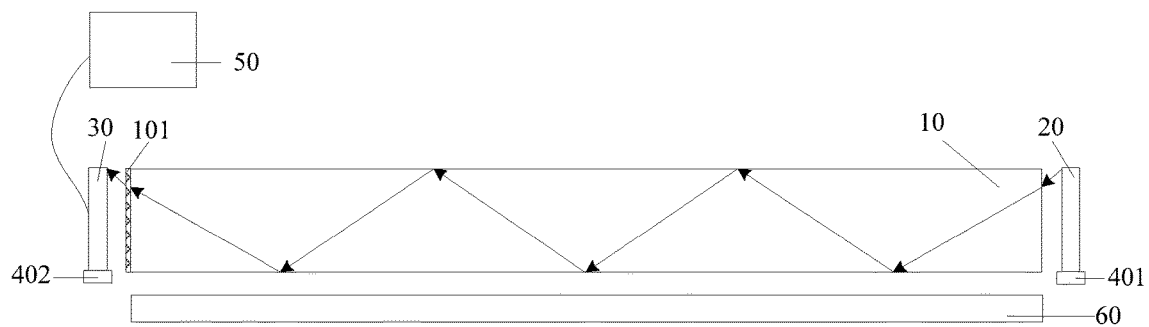
FIG. 9(b) is a second schematic view illustrating structure of a display device provided by an embodiment of the present disclosure.

An embodiment of present disclosure further provides a display device, as illustrated in FIG. 9(a) and FIG. 9(b), the display device includes the above described fingerprint identification device and a display panel 60, wherein the fingerprint identification module in the fingerprint identification device is provided above the display panel 60.

The display panel 60 can be a LCD (liquid crystal display) display panel, and can also be an OLED (organic light-emitting diode) display panel.

The display device can be a liquid crystal display, an OLED display, a television, a notebook, a digital photo frame, a mobile phone, a tablet computer, a navigator, or any product or component having display function.

In addition, the transparent substrate 10 in the fingerprint identification module can be a protection cover plate of the display device.

In the embodiment of the present disclosure, the light is emitted by the light sources 201 in the fingerprint identification module, after being totally reflected in the transparent substrate 10, is finally received by the receiving part 30. When the emission part 20 and the receiving part 30 are moved at the same time, in the same direction and by the same displacement, the processor 50 analyzes the intensity of the light received by the receiving part 30, to obtain the fingerprint information. In this display device, the fingerprint identification can be achieved in the display region, and thus the user's experience is largely improved without affecting display effect.

What has been described above is only the exemplary embodiment of the present invention, and is not used to limit the protection scope of the present invention, which is only defined by the appending claims.

The present application claims the priority of a Chinese Patent Application No. 201610162060.2, filed on Mar. 21, 2016, the disclosure of which is entirely incorporated herein by reference as a part of the present disclosure.

The invention claimed is:

1. A fingerprint identification module including a transparent substrate, an emission part, a receiving part and a moving part, wherein the emission part and the receiving part are provided adjacent to opposite edges of the transparent substrate, and the emission part and the receiving part are fixed on the moving part, wherein, the emission part includes a plurality of light sources arranged side by side, light emitted from the light sources is incident in the transparent substrate at a first angle $\theta_1$ so as to be propagated in the transparent substrate in a total reflection form, the first angle $\theta_1$ is an angle between the incident light and an incident surface;

the transparent substrate is provided with an adjusting structure configured to allow the light totally reflected in the transparent substrate to exit and irradiate towards the receiving part;

the receiving part is configured to receive the light incident into the transparent substrate and exiting through the adjusting structure, the receiving part includes a prism and a second receiver, and the prism is configured to irradiate the light emitted by each of the light sources via the adjusting structure to the second receiver, wherein the plurality of light sources arranged side by side emit the light sequentially; and the moving part is configured to allow the emission part and the receiving part to be moved simultaneously in a same direction and by a same displacement.

2. The fingerprint identification module according to claim 1, wherein the light is incident into the transparent substrate at the first angle $\theta_1$, and is totally reflected after being refracted at a second angle $\theta_2$, $\theta_2$ satisfies:

$$\theta_2 \geq \arctan\left(\frac{L}{2D}\right);$$

wherein L is a width of a finger, D is a thickness of the transparent substrate, and the second angle $\theta_2$ is an angle between the light incident into the transparent substrate and before a first total reflection is occurred and a normal line of the incident surface.

3. The fingerprint identification module according to claim 2, wherein $\theta_2$ further satisfies:

$$\theta_2 \leq \arctan\left(\frac{S}{2D}\right);$$

wherein S≥2L, and S is a moving distance of the moving part.

4. The fingerprint identification module according to claim 1, wherein the light sources are configured to emit parallel and unidirectional infrared light.

5. The fingerprint identification module according to claim 1, wherein the receiving part includes a plurality of first receivers arranged side by side, and the first receivers correspond to the light sources one by one.

6. The fingerprint identification module according to claim 1, wherein the emission part includes two columns of light sources, each column includes a plurality of light sources arranged side by side, wherein except the light sources located at both ends of the columns, any one of the light sources in any one column is located between two light sources in the other column.

7. The fingerprint identification module according to claim 1, wherein the moving part includes a first moving sub part and a second moving sub part;
the emission part is fixed on the first moving sub part and the receiving part is fixed on the second moving sub part.

8. The fingerprint identification module according to claim 1, wherein the emission part and the receiving part are provided below the transparent substrate; or
the emission part and the receiving part are respectively provided at lateral sides of the opposite edges of the transparent substrate.

9. The fingerprint identification module according to claim 1, wherein the adjusting structure includes a prism structure or a microstructure.

10. The fingerprint identification module according to claim 1, wherein the receiving part includes an optical sensor.

11. The fingerprint identification module according to claim 1, wherein the light sources arranged side by side in the emission part are arranged in a direction perpendicular to a direction from one edge to another edge of the opposite edges of the transparent substrate.

12. The fingerprint identification module according to claim 5, wherein the first receivers in the receiving part are arranged in a direction perpendicular to a direction from one edge to another edge of the opposite edges of the transparent substrate.

13. The fingerprint identification module according to claim 11, wherein the moving part is configured to move in a direction parallel with a surface of the transparent substrate and perpendicular to an arrangement direction of the plurality of light sources.

14. A fingerprint identification device including the fingerprint identification module according to claim 1 and a processor;
wherein the processor is connected with the receiving part in the fingerprint identification module for obtaining fingerprint information according to intensity of the light received by the receiving part.

15. The fingerprint identification device according to claim 14, wherein the light is incident into the transparent substrate at the first angle $\theta_1$, and is totally reflected after being refracted at a second angle $\theta_2$,
$\theta_2$ satisfies:

$$\theta_2 \geq \arctan\left(\frac{L}{2D}\right);$$

wherein L is a width of a finger, D is a thickness of the transparent substrate, and the second angle $\theta_2$ is an angle between the light incident into the transparent substrate and before a first total reflection is occurred and a normal line of the incident surface.

16. The fingerprint identification device according to claim 15, wherein $\theta_2$ further satisfies:

$$\theta_2 \leq \arctan\left(\frac{S}{2D}\right);$$

wherein S≥2L, and S is a moving distance of the moving part.

17. The fingerprint identification device according to claim 14, wherein the light sources are configured to emit parallel and unidirectional infrared light.

18. The fingerprint identification device according to claim 14, wherein the receiving part includes a plurality of first receivers arranged side by side, and the first receivers correspond to the light sources one by one.

19. A display device including a display panel and a fingerprint identification device according to claim 14, wherein the fingerprint identification module in the fingerprint identification device is provided above the display panel.

\* \* \* \* \*